(12) United States Patent
Sato

(10) Patent No.: US 8,598,258 B2
(45) Date of Patent: Dec. 3, 2013

(54) TIRE RUBBER COMPOSITION AND PNEUMATIC TIRE

(75) Inventor: Daisuke Sato, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 13/557,373

(22) Filed: Jul. 25, 2012

(65) Prior Publication Data

US 2013/0030102 A1 Jan. 31, 2013

(30) Foreign Application Priority Data

Jul. 26, 2011 (JP) ................................. 2011-163431

(51) Int. Cl.
| | |
|---|---|
| *C08L 9/00* | (2006.01) |
| *C08L 93/04* | (2006.01) |
| *C08L 45/02* | (2006.01) |
| *C08K 5/11* | (2006.01) |

(52) U.S. Cl.
USPC ............ 524/274; 524/571; 524/502; 524/526; 524/314; 525/206

(58) Field of Classification Search
USPC ............ 524/274, 571, 502, 526, 314; 525/206
See application file for complete search history.

(56) References Cited

U.S. PATENT DOCUMENTS

| | | | |
|---|---|---|---|
| 2010/0016472 A1* | 1/2010 | Wang et al. | 523/201 |
| 2010/0132866 A1* | 6/2010 | Imoto | 152/517 |

FOREIGN PATENT DOCUMENTS

| | | | |
|---|---|---|---|
| JP | 2006-249230 A | 9/2006 | |
| JP | 2007-277307 A | 10/2007 | |
| JP | 2009-7454 A | 1/2009 | |
| JP | 2011-144323 A | 7/2011 | |

* cited by examiner

*Primary Examiner* — William Cheung
(74) *Attorney, Agent, or Firm* — Birch, Stewart, Kolasch & Birch, LLP

(57) ABSTRACT

The present invention provides a tire rubber composition which improves in fuel economy, processability, adhesion, and rubber strength in a balanced manner, and a pneumatic tire. The tire rubber composition includes: a rubber component; a plasticizer (a); and at least one of a resin and a plasticizer (b), the resin being at least one selected from the group consisting of aromatic petroleum resins, terpenic resins, and rosin resins. The plasticizer (a) has a glass transition point of −50° C. or lower. The resin and the plasticizer (b) each have a glass transition point of −40° C. to 20° C. The tire rubber composition includes, for each 100 parts by mass of the rubber component, 1 to 30 parts by mass of the plasticizer (a) and 1 to 30 parts by mass in total of the at least one of the resin and the plasticizer (b).

11 Claims, No Drawings

TIRE RUBBER COMPOSITION AND PNEUMATIC TIRE

TECHNICAL FIELD

The present invention relates to a tire rubber composition and a pneumatic tire produced using the same.

BACKGROUND ART

Recent concern for environmental issues such as global warming has led to an increasing social demand for lower fuel consumption. In order to respond to the demand for lower fuel consumption automobiles, development of fuel efficient tires with reduced rolling resistance is being required. Known as methods for reducing the rolling resistance of tires in terms of materials are, for example, a technique of replacing carbon black with silica, a technique of reducing the amount of filler which causes energy loss, and a technique of using a modified rubber having a functional group which is highly reactive with silica.

Although the above techniques can improve the performance in terms of rolling resistance, the reduction in the amount of filler and the use of the modified rubber each tend to cause reduction in rubber strength. Further, if the modified rubber is used, it needs to be kneaded enough to sufficiently react with silica. As a result, the surface of the rubber composition is made rough so that the adhesive force (adhesion) is reduced, which results in a decrease in the building processability of tires.

In order to improve the adhesion and the rubber strength, the use of aliphatic petroleum resin or aromatic petroleum resin has been studied; however, these uses disadvantageously deteriorate the fuel economy. Patent Document 1 teaches a method of improving the fuel economy and braking performance by use of natural rubber, white filler, a specific resin, and the like. This document, however, does not discuss satisfying the fuel economy, processability, adhesion, and rubber strength simultaneously.

Patent Document 1: JP 2009-7454 A

SUMMARY OF THE INVENTION

The present invention aims to provide a tire rubber composition which can solve the above problem and can improve the fuel economy, processability, adhesion, and rubber strength in a balanced manner, and a pneumatic tire.

The present invention relates to a tire rubber composition, including: a rubber component; a plasticizer (a); and at least one of a resin and a plasticizer (b), the resin being at least one selected from the group consisting of aromatic petroleum resins, terpenic resins, and rosin resins, the plasticizer (a) having a glass transition point of −50° C. or lower, the resin and the plasticizer (b) each having a glass transition point of −40° C. to 20° C., and the tire rubber composition including, for each 100 parts by mass of the rubber component, 1 to 30 parts by mass of the plasticizer (a) and 1 to 30 parts by mass in total of the at least one of the resin and the plasticizer (b).

Preferably, the tire rubber composition includes, for 100 parts by mass of the rubber component, 10 to 120 parts by mass of silica having a nitrogen adsorption specific surface area of 50 m²/g or more, and includes, based on 100% by mass of the rubber component, 10% by mass or more of a modified diene rubber which is modified by a compound represented by the following formula (I):

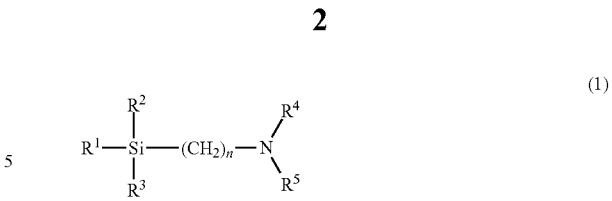

wherein $R^1$, $R^2$, and $R^3$ may be the same as or different from each other, and each represent an alkyl group, an alkoxy group, a silyloxy group, an acetal group, a carboxyl group, a mercapto group, or a derivative thereof; $R^4$ and $R^5$ may be the same as or different from each other, and each represent a hydrogen atom or an alkyl group; and n represents an integer.

Preferably, the silica includes silica (1) having a nitrogen adsorption specific surface area of 50 m²/g or more but less than 120 m²/g and silica (2) having a nitrogen adsorption specific surface area of 120 m²/g or more, and a total amount of the silica (1) and the silica (2) is 10 to 120 parts by mass for each 100 parts by mass of the rubber component.

The silica (1) and the silica (2) preferably satisfy the following relations:

(nitrogen adsorption specific surface area of silica (2))/(nitrogen adsorption specific surface area of silica (1))≥1.4; and (amount of silica (1))×0.06≤(amount of silica (2))≤(amount of silica (1))×15.

The tire rubber composition preferably includes a butadiene rubber having a cis content of double bonds of 50 mol % or less and a butadiene rubber having a cis content of double bonds of 95 mol % or more.

The butadiene rubber having a cis content of double bonds of 95 mol % or more is preferably obtained by polymerization in the presence of a neodymium catalyst.

At least one of the plasticizer (a) and the plasticizer (b) is preferably a diene polymer having a Weight average molecular weight of 3,000 to 150,000.

Preferably, the plasticizer (a) is at least one of an ester plasticizer and a diene polymer having a weight average molecular weight of 3,000 to 150,000 and a vinyl content of 35 mol % or less, and the diene polymer has been modified by the compound represented by the formula (1).

At least one of the plasticizer (a) and the plasticizer (b) is preferably a diene polymer having an epoxidation degree of 25 mol % or less.

The tire rubber composition is preferably for use in a sidewall.

The present invention also relates to a pneumatic tire produced using the rubber composition.

Since the present invention provides a tire rubber composition that includes predetermined amounts of a plasticizer (a) having a glass transition point in a specific range and at least one of a resin and a plasticizer (b) each having a glass transition point in a specific range, the fuel economy, processability, adhesion, and rubber strength can be improved in a balanced manner.

MODES FOR CARRYING OUT THE INVENTION

The tire rubber composition of the present invention includes predetermined amounts of the plasticizer (a) and at least one of the resin and the plasticizer (b), the resin being selected from the group consisting of aromatic petroleum resins, terpenic resins, and rosin resins. The glass transition point of the plasticizer (a) is −50° C. or lower and the glass transition points of the resin and the plasticizer (b) are −40° C. to 20° C.

The use of predetermined amounts of the plasticizer (a) having a glass transition point in a specific range and at least one of the predetermined resin and the plasticizer (b) each having a glass transition point in a specific range greatly enhances the effect of the plasticizer (a) in reducing the rolling resistance and the effects of the resin and the plasticizer (b) in improving the adhesion and rubber strength. Therefore, the performance in terms of rolling resistance (fuel economy), processability, adhesion, and rubber strength is synergistically improved, so that these performance properties are achieved at high levels in a balanced manner while good handling stability is also achieved. Further, the combination use of materials having different temperature ranges leads to excellent rubber strength over a wide temperature range.

In addition, as the durability of a rubber composition is improved, light-weight tires can be produced. This makes it possible to improve the productivity and reduce power consumption during the production, thereby enabling both tire products and their production processes to be environment-friendly.

The rubber component used in the present invention is not particularly limited. Examples of rubbers which may be contained in the rubber component include isoprene-based rubbers such as natural rubber (NR) and isoprene rubber (IR), and diene rubbers such as butadiene rubber (BR), styrene-butadiene rubber (SBR), acrylonitrile-butadiene rubber (NBR), chloroprene rubber (CR), butyl rubber (IIR), and styrene-isoprene-butadiene copolymer rubber (SIBR).

In particular, isoprene-based rubbers are preferred in terms of achieving good fuel economy, rubber strength, and building processability, whereas diene rubbers are preferred in terms of flex fatigue resistance and reversion resistance. Further, combination use of an isoprene-based rubber and a diene rubber is more preferred in terms of achieving good fuel economy, processability, adhesion, and rubber strength.

Examples of the isoprene-based rubber include natural rubber (NR) and isoprene rubber (IR). The NR is not particularly limited, and any one commonly used in the tire industry, such as SIR20, RSS #3, TSR20, and ENR25, may be used. The IR is also not particularly limited, and any one commonly used in the tire industry may be used. NR is particularly preferred because it provides good rubber strength.

The amount of isoprene-based rubber is preferably 10% by mass or more, and more preferably 30% by mass or more, based on 100% by mass of the rubber component. If the amount is less than 10% by mass, sufficient rubber strength and fuel economy may not be achieved. The amount is preferably 80% by mass or less, and more preferably 60% by mass or less, based on 100% by mass of the rubber component. If the amount is more than 80% by mass, the viscosity of the unvulcanized rubber composition tends to be high so that the kneading processability may be poor, and the flex fatigue resistance tends to be poor.

The diene rubber is not particularly limited. BR or SBR is preferred, and BR is more preferred, because they contribute to good fuel economy, processability, adhesion, and rubber strength. The diene rubber is preferably one modified by a compound represented by the following formula (1) (modified diene rubber) because it contributes to high levels of fuel economy, processability, adhesion, and rubber strength.

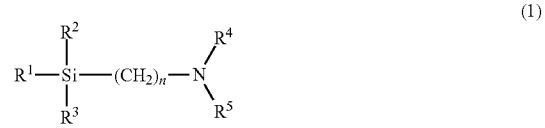

In the formula (1), $R^1$, $R^2$, and $R^3$ may be the same as or different from each other, and each represent an alkyl group, an alkoxy group, a silyloxy group, an acetal group, a carboxyl group (—COOH), a mercapto group (—SH), Or a derivative thereof; $R^4$ and $R^5$ may be the same as or different from each other, and each represent a hydrogen atom or an alkyl group; and n represents an integer.

The cis content of BR is not particularly limited. Low-cis BR with a cis content of 50 mol % or less (but preferably 5 mol % or more), or high-cis BR with a cis content of 95 mol % or more may be suitably used. In particular, combination use of these BRs is preferred because the effects of the present invention are well achieved. The amount of low-cis BR is preferably the same as that of low-cis modified BR mentioned later, and the amount of high-cis BR is preferably the same as that of high-cis modified BR mentioned later.

In the case of the combination use, the relationship between the amounts of low-cis BR and high-cis BR is preferably the same as that between the amounts of low-cis modified BR and high-cis modified BR mentioned later.

The amount of BR is preferably 10% by mass or more, and more preferably 30% by mass or more, based on 100% by mass of the rubber component. If the amount is less than 10% by mass, adequate flex fatigue resistance may not be achieved. The amount is preferably 90% by mass or less, and more preferably 70% by mass or less, based on 100% by mass of the rubber component. If the amount is more than 90% by mass, the cohesiveness of the rubber composition during kneading tends to be poor, thereby resulting in poor processability and productivity.

Examples of the modified diene rubber include those disclosed in JP 2010-111753 A.

In the formula (I), $R^1$, $R^2$, and $R^3$ each are preferably an alkoxy group (preferably a C1-C6 alkoxy group, and more preferably a C1-C4 alkoxy group) in terms of achieving high levels of fuel economy, processability, adhesion, and rubber strength. $R^4$ and $R^5$ each are preferably an alkyl group (preferably a C1-C4 alkyl group, and more preferably a C1-C2 alkyl group). Further, n is preferably 1 to 5, more preferably 2 to 4, and further preferably 3. The use of such a preferred compound leads to excellent fuel economy, processability, adhesion, and rubber strength.

Specific examples of the compound represented by the formula (1) include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. In particular, 3-dimethylaminopropyltrimethoxysilane, 3-dimethylaminopropyltriethoxysilane, and 3-diethylaminopropyltrimethoxysilane are preferred because they improve the aforementioned performance properties well. Each of these may be used alone, or two or more of these may be used in combination.

The method of modifying diene rubber by the compound represented by the formula (I) may be a conventionally known method such as those as disclosed in JP H06-53768 B and JP H06-57767 B. For example, diene rubber may be modified by being brought into contact with the compound. Specific examples thereof include a method in which, after the production of diene rubber (e.g. butadiene rubber) by anion polymerization, a predetermined amount of the compound is added to the resulting rubber solution to cause a reaction between the polymerizing end (active end) of the diene rubber and the compound.

The diene rubber to be modified is not particularly limited. In terms of achieving good fuel economy, processability, adhesion, and rubber strength, butadiene rubber (BR) is preferred.

In the case that the diene rubber to be modified is BR, the cis content of the resulting modified diene rubber (modified BR) is not particularly limited. Those having a cis content of double bonds of 50 mol % or less (low-cis modified BR), those having a cis content of double bonds of 95 mol % or more (high-cis modified BR), and the like may be suitably used. In particular, combination use of the low-cis modified BR and the high-cis modified BR is preferred because such use leads to high levels of fuel economy, processability, adhesion, and rubber strength.

The cis content of the low-cis modified BR is preferably 50 mol % or less, and more preferably 45 mol % or less, whereas it is preferably 5 mol % or more, and more preferably 10 mol % or more. If the cis content is in the above range, good processability is achieved and the effects of the present invention are well achieved.

The amount of cis units (cis content) herein is measured by the method described in the below-mentioned EXAMPLES.

The amount of the low-cis modified BR, based on 100% by mass of the rubber component, is preferably 10% by mass or more, and more preferably 20% by mass or more, whereas it is preferably 80% by mass or less, and more preferably 40% by mass or less. If the amount is in the above range, good fuel economy, processability, adhesion, and rubber strength are achieved.

The high-cis modified BR is not particularly limited. It is preferably one obtained by polymerization in the presence of a neodymium catalyst (Nd catalyst) (such a BR is referred to as Nd high-cis modified BR) because it effectively improves the balance of the aforementioned performance properties.

Examples of the Nd catalyst include halides, carboxylates, alcoholates, thioalcoholates, and amides of Nd. Nd high-cis BR to be used in the production of the Nd high-cis modified BR may be prepared by polymerizing 1,3-butadiene in a reaction-inert organic solvent, such as hydrocarbon solvents (e.g. aliphatic, alicyclic, and aromatic hydrocarbon compounds), in the presence of a Nd catalyst and, if necessary, a promoter such as an Al- or B-containing compound. Further, the Nd high-cis modified BR may be produced by bringing the polymer obtained by the above polymerization into contact with the aforementioned compound.

The cis content of double bonds of the high-cis modified BR is 95 mol % or more, and is preferably 97 mol % or more. A cis content of 95 mol % or more leads to good flex fatigue resistance:

The amount of the high-cis modified BR, based on 100% by mass of the rubber component, is preferably 10% by mass or more, and more preferably 20% by mass or more, whereas it is preferably 80% by mass or less, and more preferably 40% by mass or less. If the amount is in the above range, good fuel economy, processability, adhesion, and rubber strength are achieved.

The amounts of the low-cis modified BR and high-cis modified BR preferably satisfy the following formula.

$$0.5 \leq (\text{amount of low-cis modified BR})/(\text{amount of high-cis modified BR}) \leq 10$$

If the ratio of (amount of low-cis modified BR)/(amount of high-cis modified BR) is less than 0.5, adequate kneading processability may not be achieved. If the ratio is more than 10, adequate flex fatigue resistance may not be achieved.

The amount of the modified diene rubber (the total amount of the low-cis modified BR and high-cis modified BR in the case of using the low-cis modified BR and high-cis modified BR in combination) is preferably 10% by mass or more, and more preferably 30% by mass or more, based on 100% by mass of the rubber component. If the amount is less than 10% by mass, the effect of the modified diene rubber in improving the fuel economy may not be sufficiently achieved. The amount is preferably 80% by mass or less, and more preferably 60% by mass or less, based on 100% by mass of the rubber component. If the amount is more than 80% by mass, the polymer and silica tend to react strongly with each other, thereby failing to achieve adequate tensile strength, and the kneading processability tends to be poor.

The weight average molecular weight (Mw) of diene rubber is preferably 200,000 or more, and more preferably 300,000 or more. If the Mw is less than 200,000, the tensile strength and flex fatigue resistance tend to decrease. The Mw is preferably 2,000,000 or less, and more preferably 1,000,000 or less. If the Mw is more than 2,000,000, the processability tends to be decreased to cause dispersion failure, thereby resulting in a decrease in tensile strength.

The weight average molecular weight (Mw) herein is a value measured by the method described in the below-mentioned EXAMPLES.

The amount of diene rubber is preferably 10% by mass or more, and more preferably 30% by mass or more, based on 100% by mass of the rubber component. If the amount is less than 10% by mass, adequate flex fatigue resistance may not be achieved. The amount is preferably 90% by mass or less, and more preferably 70% by mass or less, based on 100% by mass of the rubber component. If the amount is more than 90% by mass, the cohesiveness of the rubber composition during kneading tends to be poor, thereby resulting in poor processability and productivity.

The weight average molecular weight (Mw) of the rubber component is preferably 200,000 or more.

The glass transition point (glass transition temperature (Tg)) of the plasticizer (a) is −50° C. or lower, and preferably −60° C. or lower. If the Tg is higher than −50° C., the fuel economy, processability, adhesion, and rubber strength tend not to be improved in a balanced manner. The Tg is preferably −80° C. or higher. If the Tg is lower than −80° C., the rubber rigidity tends to be greatly decreased, thereby resulting in a decrease in handling stability, and the Tg of the rubber composition tends to be greatly decreased, thereby resulting in a decrease in rubber strength at ambient temperatures.

The glass transition point (Tg) herein is a value measured by the method described in the below-mentioned EXAMPLES.

The plasticizer (a) is not particularly limited. Examples thereof include ester plasticizers, diene polymers having a weight average molecular weight (Mw) of 3,000 to 150,000, and aromatic oils.

In particular, ester plasticizers are preferred in terms of achieving good fuel economy, processability, adhesion, and rubber strength, and diene polymers having a weight average molecular weight (Mw) of 3,000 to 150,000 are preferred in terms of achieving excellent rubber strength and durability.

Examples of the ester plasticizers include phthalic acid derivatives, long-chain fatty acid derivatives, phosphoric acid derivatives, sebacic acid derivatives, and adipic acid derivatives.

Examples of the phthalic acid derivatives include phthalates such as di-2-ethylhexyl phthalate (DOP) and diisodecyl phthalate (DIDP). Examples of the long-chain fatty acid derivatives include long-chain fatty acid glycerol esters. Examples of the phosphoric acid derivatives include phosphates such as tri(2-ethylhexyl)phosphate (TOP) and tributyl phosphate (TBP). Examples of the sebacic acid derivatives include sebacates such as di(2-ethylhexyl)sebacate (DOS) and diisooctyl sebacate (DIOS). Examples of the adipic acid derivatives include adipates such as di(2-ethylhexyl)adipate (DOA) and diisooctyl adipate (DIOA). In particular, sebacates and adipates are preferred in terms of achieving good fuel economy, processability, adhesion, and rubber strength, and DOS and DOA are more preferred.

The diene polymer is not particularly limited as long as it satisfies the above ranges of glass transition point and Mw. In particular, butadiene polymers and styrene-butadiene copolymers are preferred in terms of achieving good fuel economy, processability, adhesion, and rubber strength.

The weight average molecular weight (Mw) of the diene polymer is preferably 3,000 or more, and more preferably 20,000 or more. If the Mw is less than 3,000, the effect of improving the rubber strength may not be sufficiently achieved. The Mw is preferably 150,000 or less, and more preferably 120,000 or less. If the Mw is more than 150,000, the effect of improving the adhesion may not be sufficiently achieved.

The vinyl content of the diene polymer is preferably 35 mol % or less, and more preferably 25 mol % or less. If the vinyl content is more than 35 mol %, the fuel economy tends to be poor.

The vinyl content of the diene polymer may be measured by infrared absorption spectrometry.

Also as the diene polymer, one modified by the compound represented by the formula (I) or epoxidized one (one having an epoxy group) may be suitably used in terms of achieving excellent fuel economy.

In the compound used for the diene polymer, $R^1$, $R^2$, $R^3$, $R^4$, $R^5$, and n are preferably as defined in the aforementioned modified diene rubber. The use of such a preferred compound leads to high levels of fuel economy, processability, adhesion, and rubber strength.

The method of modifying diene polymer is not particularly limited, and the modification may be carried out similarly to the method of modifying diene rubber as mentioned above. For example, the modification may be carried out by bringing diene polymer into contact with the compound. Specific examples thereof include a method in which, after the production of diene polymer (e.g. butadiene polymer) by anion polymerization, a predetermined amount of the compound is added to the resulting polymer solution to cause a reaction between the polymerizing end (active end) of the diene polymer and the compound.

The method of epoxidizing diene polymer is not particularly limited. Examples thereof include a chlorohydrin process, direct oxidation process, hydrogen peroxide process, alkyl hydroperoxide process, and peracid process (for example, see JP H04-26617 B, JP H02-110182 A, and GB 2113692 B). Examples of the peracid process include a process in which diene polymer is reacted with an organic peracid such as peracetic acid or performic acid.

The epoxidation degree of the epoxidized diene polymer is preferably 25 mol % or less, more preferably 15 mol % or less, and further preferably 8 mol % or less. If the epoxidation degree is more than 25 mol %, the Tg may be greatly increased, thereby failing to achieve adequate fuel economy. The lower limit of the epoxidation degree is not particularly limited, and is preferably 2 mol % or more.

In the present invention, the epoxidation degree is a ratio (mol %) of the number of epoxidized double bonds to the total number of double bonds in the rubber before epoxidation. Also, in the present invention, the epoxidation degree is a value measured by the method described in the below-mentioned EXAMPLES.

The amount of plasticizer (a) is 1 part by mass or more, and preferably 5 parts by mass or more, for each 100 parts by mass of the rubber component. If the amount is less than 1 part by mass, the effect of improving the fuel economy may not be sufficiently achieved. The amount is 30 parts by mass or less, and preferably 20 parts by mass or less, for each 100 parts by mass of the rubber component. If the amount is more than 30 parts by mass, the rigidity of the rubber composition tends to be greatly impaired, thereby resulting in a decrease in handling stability. Moreover, the adhesion tends to be too high, thereby resulting in very poor productivity as the rubber composition sticks to the production facilities during its processing. In addition, bleeding tends to easily occur, thereby resulting in a decrease in adhesion.

The glass transition points (Tg) of the resin and the plasticizer (b) are −40° C. or higher, and preferably −30° C. or higher. Those having a Tg lower than −40° C. mean that the plasticizer (a) and a material that has properties close to those of the plasticizer (a) are combined. Thus, the effects of the present invention resulting from the combination use of two components having different Tg values tend to be difficult to obtain. The Tg is 20° C. or lower, preferably 0° C. or lower, and more preferably −10° C. or lower. If the Tg is higher than 20° C., the fuel economy tends to be poor.

The resin used is at least one resin selected from the group consisting of aromatic petroleum resins, terpenic resins, and rosin resins. In particular, aromatic petroleum resins are preferred because they have a large effect of improving the rubber strength and contribute to a good balance between fuel economy, processability, adhesion, and rubber strength.

The aromatic petroleum resins are resins obtained by polymerizing the C9 (carbon number: 9) aromatic fraction which is generally obtained by pyrolysis of naphtha and which includes, as main monomers, vinyltoluene and indene. Here, other components of the aromatic fraction include styrene homologs such as α-methylstyrene and β-methylstyrene. The aromatic petroleum resin may include a coumarone unit. The aromatic petroleum resin is preferably a coumarone resin, α-methylstyrene resin, or coumarone-indene resin, and more preferably a coumarone-indene resin, in terms of achieving good fuel economy, processability, adhesion, and rubber strength.

Examples of commercially available products of these resins include NOVARES C10 (RUTGERS Chemical) and Picco A-10 (Eastman Chemical Company).

The terpenic resins refer to resins obtained by polymerizing, as main monomers, terpene compounds contained in essential plant oils which are generally obtained from leaves, trees, roots, and the like of plants. In general, the terpene compounds are polymers of isoprene ($C_5H_8$), have basic terpene skeletons and are classified as monoterpenes ($C_{10}H_{16}$), sesquiterpenes ($C_{15}H_{24}$), diterpenes ($C_{20}H_{32}$) and the like. Examples thereof include α-pinene, β-pinene, dipentene, limonene, myrcene, alloocimene, ocimene, α-phellandrene, α-terpinene, γ-terpinene, terpinolene, 1,8-cineol, 1,4-cineol, α-terpineol, β-terpineol, γ-terpineol, camphene, tricyclene, sabinene, paramenthadienes, and carenes.

The terpenic resins includes terpene resins whose raw material is the aforementioned terpene compound, such as α-pinene resin, β-pinene resin, limonene resin, dipentene resin, and β-pinene/limonene resin; as well as aromatic-modified terpene resins whose raw material is a combination of the terpene compound and an aromatic compound; terpene phenolic resins whose raw material is a combination of the terpene compound and a phenolic compound; and hydrogenated terpene resins obtained by hydrogenating terpene resins. Examples of the aromatic compound used as a raw material for the aromatic-modified terpene resins include styrene, α-methylstyrene, vinyltoluene, and divinyltoluene. Examples of the phenolic compound used as a raw material for the terpene phenolic resins include phenol, bisphenol A, cresol, and xylenol. Each of these terpenic resins may be used alone, or two or more of these may be used in combination. The terpenic resin is preferably a terpene resin or an aromatic-modified terpene resin. It is more preferably one obtained from p-pinene as a main raw material in terms of achieving excellent fuel economy.

Examples of commercially available products of these resins include YS Resin PX300, YS Resin PX300N, Dimerone, and YS Polyester T30 (YASUHARA CHEMICAL CO., LTD.).

As the rosin resin, various known ones may be used. Examples thereof include: rosins such as raw rosins (e.g. gum rosin, wood rosin, and tall oil rosin), disproportionated products of raw rosins, stabilized rosins obtained by hydrogenating raw rosins, and polymerized rosins; esterified rosins (rosin ester resins); phenol-modified rosins; unsaturated acid (e.g. maleic acid)—modified rosins; and formylated rosins obtained by reducing rosins. In particular, polymerized rosins, phenol-modified rosins, unsaturated acid-modified rosins, and rosin ester resins are preferred, and rosin ester resins are more preferred, because they contribute to a good balance between fuel economy, processability, adhesion, and rubber strength. The rosin ester resins are produced by esterification of the aforementioned rosin and a polyol (polyhydric alcohol such as glycerol or pentaerythritol). The esterification may be performed by a known method such as a method in which a rosin and a polyol are heated to from 200° C. to 300° C. in an inert gas atmosphere and generated water is removed from the system. The rosin resin may be used in an emulsified form (as an emulsion) formed using a known emulsifier. For example, an emulsion of a stabilized rosin ester resin may be suitably used.

Examples of commercially available products of these resins include HARIESTER SK-501NS (Harima Chemicals, Inc.).

The plasticizer (b) is not particularly limited as long as it satisfies the aforementioned range of Tg, and diene polymers having a weight average molecular weight (Mw) of 3,000 to 150,000 may be used for example. In the case of using a diene polymer as the plasticizer (b), the epoxidation degree thereof is preferably 25 mol % or less.

The total amount of the resin and plasticizer (b) is 1 part by mass or more, and preferably 5 parts by mass or more, for each 100 parts by mass of the rubber component. If the total amount is less than 1 part by mass, the effect of improving the rubber strength may not be sufficiently achieved. The total amount is 30 parts by mass or less, and preferably 20 parts by mass or less, for each 100 parts by mass of the rubber component. If the amount is more than 30 parts by mass, the rigidity of the rubber composition tends to be greatly impaired, thereby resulting in a decrease in handling stability.

The total amount of the plasticizer (a), the resin, and the plasticizer (b) is, for each 100 parts by mass of the rubber component, preferably 5 parts by mass or more, and more preferably 10 parts by mass or more, but preferably 50 parts by mass or less, and more preferably 35 parts by mass or less.

If the total amount is in the above range, the fuel economy, processability, adhesion, rubber strength, and handling stability are well achieved.

In the present invention, it is preferable to use silica. This leads to excellent fuel economy. The silica is not particularly limited, and examples thereof include dry silica (anhydrous silica) and wet silica (hydrous silica). Wet silica (hydrous silica) is preferred because it contains many silanol groups.

The nitrogen adsorption specific surface area ($N_2SA$) of silica is preferably 50 $m^2/g$ or more, and more preferably 100 $m^2/g$ or more. The $N_2SA$ is preferably 250 $m^2/g$ or less, and more preferably 120 $m^2/g$ or less. If the $N_2SA$ is in the above range, the effects of the present invention are well achieved.

In the present invention, the $N_2SA$ of silica is a value measured by the BET method in accordance with ASTM D 3037-81.

In the present invention, it is preferable to use silica (1) having an $N_2SA$ of 50 $m^2/g$ or more but less than 120 $m^2/g$ and silica (2) having an $N_2SA$ of 120 $m^2/g$ or more in combination.

The $N_2SA$ of silica (1) is 50 $m^2/g$ or more, and preferably 70 $m^2/g$ or more. If the $N_2SA$ is less than 50 $m^2/g$, adequate reinforcement tends not to be achieved, thereby resulting in poor rubber strength and flex fatigue resistance. The $N_2SA$ is less than 120 $m^2/g$, and is preferably 100 $m^2/g$ or less. If the $N_2SA$ is 120 $m^2/g$ or more, the improving effects of blended silica may not be achieved.

The $N_2SA$ of silica (2) is 120 $m^2/g$ or more, preferably 150 $m^2/g$ or more, and more preferably 180 $m^2/g$ or more. If the $N_2SA$ is less than 120 $m^2/g$, the improving effects of blended silica may not be achieved. The upper limit of the $N_2SA$ is not particularly limited, and it is preferably 250 $m^2/g$ or less, and more preferably 220 $m^2/g$ or less. If the $N_2SA$ is more than 250 $m^2/g$, the processability may be poor and the effects of the present invention may not be sufficiently achieved.

In the case that the silica (1) or silica (2) independently consists of two or more types of silica, the $N_2SA$ of each of the silica (1) and silica (2) is a value obtained by measuring a sample consisting of the corresponding whole silica.

The silica (1) and silica (2) preferably satisfy the relation: ($N_2SA$ of silica (2))−($N_2SA$ of silica (1)) 40 $m^2/g$, and more preferably the relation: ($N_2SA$ of silica (2)−(N2SA of silica (1))≥100 $m^2/g$. They also preferably satisfy the relation: ($N_2SA$ of silica (2))−($N_2SA$ of silica (1))≤180 $m^2/g$, and more preferably the relation: ($N_2SA$ of silica (2))−($N_2SA$ of silica (1))≤140 $m^2/g$. The silicas satisfying the above relations can effectively improve the balance of the above performance properties.

The silica (1) and silica (2) preferably satisfy the relation: ($N_2SA$ of silica (2))/($N_2SA$ of silica (1))≥1.4, and more preferably the relation: ($N_2SA$ of silica (2))/(N2SA of silica (1)) ≥2.0. If this ratio is smaller than 1.4, the difference between the particle sizes of silica (1) and silica (2) is so small that a blend thereof tends not to have an effect of improving the dispersibility.

The amount of silica (1) is, for each 100 parts by mass of the rubber component, preferably 1 part by mass or more, and more preferably 10 parts by mass or more, but preferably 80 parts by mass or less, and more preferably 50 Parts by mass or less. If the amount is in the above range, the fuel economy, processability, adhesion, and rubber strength are achieved at high levels.

The amount of silica (2) is, for each 100 parts by mass of the rubber component, preferably 1 part by mass or more, and more preferably 10 parts by mass or more, but preferably 80 parts by mass or less, and more preferably 50 parts by mass or less. If the amount is in the above range, the fuel economy, processability, adhesion, and rubber strength are achieved at high levels.

The amounts of silica (1) and silica (2) preferably satisfy the following formula:

(amount of silica (1))×0.06≤(amount of silica (2))≤ (amount of silica (1))×15.

If the amount of silica (2) is less than 0.06 times that of silica (1), adequate rubber strength tends not to be achieved. If the amount of silica (2) is more than 15 times that of silica (1), the rolling resistance tends to be increased. The amount of silica (2) is more preferably 0.3 or more times, and further preferably 0.5 or more times, that of silica (1), whereas it is more preferably not more than 7 times, and further preferably not more than 4 times, that of silica (1).

The amount of silica (the total amount of silica (1) and silica (2) in the case of using the silica (1) and silica (2) together) is preferably 10 parts by mass or more, more preferably 20 parts by mass or more, and further preferably 60 parts by mass or more, for each 100 parts by mass of the rubber component. If the amount is less than 10 parts by mass, the effect of silica in reducing the rolling resistance may not be achieved. The amount is preferably 120 parts by mass or less, and more preferably 80 parts by mass or less, for each 100 parts by mass of the rubber component. If the amount is more than 120 parts by mass, the flex fatigue resistance tends to be poor. In addition, the rubber rigidity tends to be so high that the cushioning effect required for tire components such as sidewalls tends to be poor, thereby resulting in tires that give a less comfortable ride.

The rubber composition of the present invention preferably contains a silane coupling agent. Examples of the silane coupling agent include sulfide-type silane coupling agents, mercapto-type silane coupling agents, vinyl-type silane coupling agents, amino-type silane coupling agents, glycidoxy-type silane coupling agents, nitro-type silane coupling agents, and chloro-type silane coupling agents. In particular, sulfide-type silane coupling agents such as bis(3-triethoxysilylpropyl)tetrasulfide, bis(2-triethoxysilylethyl)tetrasulfide, bis(3-triethoxysilylpropyl)disulfide, and bis(2-triethoxysilylethyl)disulfide are preferred, and bis(3-triethoxysilylpropyl)disulfide is more preferred.

The amount of silane coupling agent is preferably 3 parts by mass or more, and more preferably 5 parts by mass or more, for each 100 parts by mass of silica. If the amount is less than 3 parts by mass, the coupling effect tends to be insufficient so that high dispersion of silica tends not be achieved, thereby resulting in a decrease in fuel economy and tensile strength. The amount is preferably 15 parts by mass or less, and more preferably 10 parts by mass or less, for each 100 parts by mass of silica. If the amount is more than 15 parts by mass, an excess silane coupling agent may remain, thereby resulting in a decrease in the processability and breaking properties of the resulting rubber composition.

The rubber composition of the present invention preferably contains carbon black. The nitrogen adsorption specific surface area ($N_2SA$) of carbon black is preferably 80 $m^2/g$ or more, and more preferably 100 $m^2/g$ or more. If the $N_2SA$ is less than 80 $m^2/g$, adequate reinforcement may not be achieved. The $N_2SA$ is preferably 200 $m^2/g$ or less, and more preferably 120 $m^2/g$ or less. If the $N_2SA$ is more than 200 $m^2/g$, the dispersibility of carbon black may be poor and adequate fuel economy may not be achieved.

The $N_2SA$ of carbon black is determined in accordance with JIS K 6217-2:2001.

The amount of carbon black is, for each 100 parts by mass of the rubber component, preferably 1 part by mass or more, and more preferably 3 parts by mass or more, but preferably 50 parts by mass or less, and more preferably 10 parts by mass or less. If the amount is in the above range, the aforementioned performance properties are well achieved.

In the case that the rubber composition contains carbon black and silica, the total amount of carbon black and silica is preferably 20 parts by mass or more, and more preferably 60 parts by mass or more, for each 100 parts by mass of the rubber component. If the total amount is less than 20 parts by mass, adequate handling stability and rubber strength may not be achieved. The total amount is preferably 120 parts by mass or less, and more preferably 90 parts by mass or less, for each 100 parts by mass of the rubber component. If the total amount is more than 120 parts by mass, adequate fuel economy and processability may not be achieved.

In the case that the rubber composition contains carbon black and silica, the total proportion of silica to 100% by mass of a total of silica and carbon black is preferably 50% by mass or more, and more preferably 80% by mass or more. If the total proportion is 50% by mass or more, the effects of the present invention are sufficiently achieved. Meanwhile, the total proportion is preferably 95% by mass or less.

In addition to the aforementioned ingredients, the rubber composition of the present invention may contain compounding ingredients generally used in production of rubber compositions, such as stearic acid, various antioxidants, zinc oxide, vulcanizing agents such as sulfur, and vulcanization accelerators, as appropriate.

The rubber composition of the present invention may be produced by a usual method. In other words, for example, the rubber composition may be produced by kneading the ingredients using a kneading apparatus such as a Bunbury mixer, a kneader, or an open roll mill, and then vulcanizing the kneaded mixture. The rubber composition may be used for various tire components such as sidewalls, base treads, clinch apexes, belts, carcasses, inner liners, and insulations. In particular, the rubber composition is preferably used for treads and sidewalls, and more preferably for sidewalls.

The pneumatic tire of the present invention may be produced using the rubber composition by a usual method. In other words, the rubber composition containing the ingredients is extruded and processed into the shape of a tire component before vulcanization, and then built with other tire components in a tire building machine by a usual method to provide an unvulcanized tire. Then, this unvulcanized tire is heat-pressurized in a vulcanizer to provide a tire.

The pneumatic tire of the present invention can be suitably used as tires for passenger vehicles, trucks and buses, two-wheeled vehicles, racing vehicles, and the like; especially, it is suitably used as tires for passenger vehicles.

EXAMPLES

The present invention will be described in detail referring to, but not limited to, examples.

The following will describe the chemicals used in Production Examples 1 to 8.

Cyclohexane: cyclohexane (KANTO CHEMICAL CO., INC.)

1,3-Butadiene: 1,3-butadiene (Tokyo Chemical Industry Co., Ltd.)

Styrene: styrene (KANTO CHEMICAL CO., INC.)

Tetramethylethylenediamine: tetramethylethylenediamine (KANTO CHEMICAL CO., INC.)

n-Butyllithium: 1.6 M solution of n-butyllithium in hexane (KANTO CHEMICAL CO., INC.)

Modifying agent (1): 3-(N,N-dimethylaminopropyl)trimethoxysilane (in the formula (1), $R^1$, $R^2$, and $R^3$=methoxy groups, $R^4$ and $R^5$=methyl groups, n=3, AZmax. co)

Modifying agent (2): 3-(N,N-dimethylaminopropyl)triethoxysilane (in the formula (I), $R^1$, $R^2$, and $R^3$=ethoxy groups, $R^4$ and $R^5$=methyl groups, n=3, AZmax. co)

2,6-tert-Butyl-p-cresol: NOCRAC 200 (OUCHI SHINKO CHEMICAL INDUSTRIAL CO., LTD.)

Neodymium 2-ethylhexanoate: neodymium 2-ethylhexanoate (Wako Pure Chemical Industries, Ltd.)

PMAO (polymethylaluminoxane): PMAO (Al: 6.8% by mass, Tosoh Finechem Corporation)

DIBAH solution: 1M toluene solution of diisobutylaluminum hydride (Tosoh Finechem Corporation)

DEAC solution: 1M hexane solution of diethylaluminum chloride (Tosoh Finechem Corporation)

TIBA solution: 1M hexane solution of triisobutylaluminum (Tosoh Finechem Corporation)

Production Example 1

A pressure-resistant container sufficiently purged with nitrogen was charged with cyclohexane (1,500 ml), 1,3-butadiene (900 mmol), tetramethylethylenediamine (0.2 mmol), and n-butyllithium (0.12 mmol), and the contents were stirred at 40° C. for 48 hours. Then, a modifying agent (1) (0.12 mmol) was added and the reaction was stopped. Thereafter, 2,6-tert-butyl-p-cresol (1 g) was added to the reaction solution, and the resulting solution was purified by re-precipitation to give BR (2).

Production Example 2

A 50-ml glass container was purged with nitrogen. The container was charged with a solution of butadiene in cyclohexane (2.0 mol/L, 8 ml), a neodymium 2-ethylhexanoate/toluene solution (0.2 mol/L, 1 ml), and PMAO (8 ml), and the contents were stirred. After 5 minutes, a DIBAH solution (5 ml) was added, and after another 5 minutes, a DEAC solution (2 ml) was added to give a catalyst solution (1).

A reactor (3-L pressure-resistant stainless-steel container) was purged with nitrogen. While the nitrogen atmosphere was maintained, the reactor was charged with cyclohexane (1,800 ml), butadiene (75 g), and a TIBA solution (1 ml), and then hermetically sealed. After the contents were stirred for 5 minutes, the catalyst solution (1) (1.5 ml) was added and the mixture was stirred while the temperature was kept at 30° C. After 3 hours, a modifying agent (2) (1 mmol) was added, and then a 2,6-tert-butyl-p-cresol/isopropanol solution (0.01M, 10 ml) was dropwise added to the reactor so that the reaction was finished. The reaction solution was cooled down and added to separately prepared methanol (3 L). The obtained precipitate was air-dried overnight, and then vacuum dried for 2 days to give BR (3). The yield was about 74.2 g.

Production Example 3

A pressure-resistant container sufficiently purged with nitrogen was charged with cyclohexane (1,500 ml), 1,3-butadiene (900 mmol), tetramethylethylenediamine (0.5 mmol), and n-butyllithium (0.5 mmol), and the contents were stirred for 48 hours at 40° C. Then, 2,6-tert-butyl-p-cresol (1 g) was added to the reaction solution, and the resulting solution was purified by re-precipitation to give a low molecular weight butadiene polymer (1).

Production Example 4

A pressure-resistant container sufficiently purged with nitrogen was charged with cyclohexane (1,500 ml), 1,3-butadiene (900 mmol), tetramethylethylenediamine (0.8 mmol), and n-butyllithium (0.8 mmol), and the contents were stirred for 48 hours at 70° C. Then, 2,6-tert-butyl-p-cresol (1 g) was added to the reaction solution, and the resulting solution was purified by re-precipitation to give a low molecular weight butadiene polymer (2).

Production Example 5

A pressure-resistant container sufficiently purged with nitrogen was charged with cyclohexane (1,500 ml), 1,3-butadiene (900 mmol), tetramethylethylenediamine (0.5 mmol), and n-butyllithium (0.5 mmol), and the contents were stirred for 48 hours at 70° C. Then, a modifying agent (1) (0.5 mmol) was added and the reaction was stopped. Thereafter, 2,6-tert-butyl-p-cresol (1 g) was added to the reaction solution, and the resulting solution was purified by re-precipitation to give a low molecular weight butadiene polymer (3).

Production Example 6

A pressure-resistant container sufficiently purged with nitrogen was charged with n-hexane (1,500 ml), styrene (10 g), 1,3-butadiene (92 g), tetramethylethylenediamine (0.25 mmol), and a solution of n-butyllithium in hexane (0.25 mmol), and the contents were stirred for 48 hours at 70° C. Then, a modifying agent (1) (0.25 mmol) was added and the mixture was stirred for 30 minutes. Methanol (1 g) was added to the polymer solution to stop the reaction. Thereafter, an oil (27 g) and 2,6-tert-butyl-p-cresol (1 g) were added to the reaction solution, and the mixture was vacuum dried for 24 hours at 50° C. to give a low-molecular weight styrene-butadiene copolymer.

Production Example 7

In a 5-L container equipped with a stirrer, a dropping funnel, and a condenser, the low molecular weight butadiene polymer (1) (300 g) synthesized in Production Example 3 was dissolved in toluene (3 L), and formic acid (4 g) was added thereto. Then, an aqueous hydrogen peroxide solution (concentration: 30% by mass, 12 g) was dropwise added, and the reaction was allowed to proceed under stirring for 4 hours at 40° C. After the reaction, an aqueous calcium carbonate solution was added so that the pH of the polymer solution was adjusted to 7. Then, the polymer solution was dropwise added to ethanol. The precipitated polymer was separated and dried to prepare an epoxidized low molecular weight butadiene polymer (1).

Production Example 8

An epoxidized low molecular weight butadiene polymer (2) was obtained in the same manner as in Production Example 7, except that 60 g of an aqueous hydrogen peroxide solution (concentration: 30% by mass) was dropwise added.

The following will describe the chemicals used in the examples and the comparative examples.

NR: TSR20 (Mw: 1,000,000)

BR (1): BR150B (non-modified, cis content: 97 mol %, Mw: 400,000, UBE INDUSTRIES, LTD.)

BR (2): produced in Production Example 1 (modified, Mw: 460,000, cis content: 40 mol %)

BR (3): produced in Production Example 2 (modified, Mw: 230,000, cis content: 99 mol %)

Carbon black: N220 (DBP oil absorption: 115 ml/g, $N_2SA$: 110 m$^2$/g, Cabot Japan K.K.)

Silica (1-1): ZEOSIL 1085GR ($N_2SA$: 80 m$^2$/g, Rhodia)
Silica (1-2): ZEOSIL 115GR ($N_2SA$: 110 m$^2$/g, Rhodia)
Silica (2-1): ZEOSIL 1165MP ($N_2SA$: 160 m$^2$/g, Rhodia)
Silica (2-2): ZEOSIL 1205MP ($N_2SA$: 200 m$^2$/g, Rhodia)

Silane coupling agent: Si75 (bis(3-triethoxysilylpropyl)disulfide, Degussa)

Aromatic oil: PROCESS X-140 (Japan Energy Corporation)

Ester plasticizer (1): di(2-ethylhexyl)sebacate (Tg: −65° C., DAIHACHI CHEMICAL INDUSTRY CO., LTD.)

Ester plasticizer (2): di(2-ethylhexyl)adipate (Tg: −70° C., DAIHACHI CHEMICAL INDUSTRY CO., LTD.)

Low molecular weight butadiene polymer (1): produced in Production Example 3 (Tg: −72° C., Mw: 130,000, vinyl content: 34 mol %)

Low molecular weight butadiene polymer (2): produced in Production Example 4 (Tg: −74° C., Mw: 90,000, vinyl content: 34 mol %)

Low molecular weight butadiene polymer (3): produced in Production Example 5 (Tg: −68° C., Mw: 130,000, vinyl content: 34 mol %, modified)

Low molecular weight butadiene polymer (4): Ricon 131 (Tg: —76° C., butadiene polymer, Mw: 5,000, vinyl content: 20 mol %, Sartomer)

Low molecular weight styrene-butadiene copolymer: produced in Production Example 6 (Tg: −52° C., Mw: 120,000, styrene component content: 10% by mass, vinyl content: 32 mol %, modified)

Epoxidized low molecular weight butadiene polymer (1): produced in Production Example 7 (Tg: −72° C., Mw: 130,000, vinyl content: 34 mol %, epoxidation degree: 4 mol %)

Epoxidized low molecular weight butadiene polymer (2): produced in Production Example 8 (Tg: −62° C., Mw: 130,000, vinyl content: 34 mol %, epoxidation degree: 24 mol %)

Aromatic petroleum resin (1): NOVARES C10 (coumarone-indene resin, Tg: −30° C., RUTGERS Chemical)

Aromatic petroleum resin (2): NOVARES C30 (coumarone-indene resin, Tg: 10° C., RUTGERS Chemical)

Aromatic petroleum resin (3): NOVARES C90 (coumarone-indene resin, Tg: 90° C., RUTGERS Chemical)

Terpenic resin: Dimerone (terpene resin obtained from β-pinene as a main component, Tg: −38° C., YASUHARA CHEMICAL CO., LTD.)

Rosin resin: HARIESTER SK-501NS (emulsion of stabilized rosin ester, Tg: −33° C., Harima Chemicals, Inc.)

Antioxidant: Santoflex 13 (Flexsys)

Stearic acid: stearic acid "TSUBAKI" (NOF Corporation)

Zinc oxide: zinc oxide #2 (MITSUI MINING & SMELTING CO., LTD.)

Sulfur: powder sulfur (TSURUMI CHEMICAL INDUSTRY CO., LTD.)

Vulcanization accelerator: NOCCELER NS(N-tert-butyl-2-benzothiazolylsulfenamide, OUCHI SHINKO CHEMICAL INDUSTRIAL CO., LTD.)

The chemicals were analyzed as follows.

(Measurement of Glass Transition Point (Tg))

The glass transition point (Tg) was a value measured at a temperature increase rate of 10° C./min using a differential scanning calorimeter (Q200, TA Instruments Japan Inc.) in accordance with JIS K 7121.

(Measurement of Weight Average Molecular Weight Mw)

The weight average molecular weight, MW, of the sample was determined relative to polystyrene standards, based on the measured value by gel permeation chromatography (GPC) (GPC-8000 series by TOSOH CORPORATION, detector: differential refractometer, column: TSKgel Super-Multipore HZ-M by TOSOH CORPORATION).

(Measurement of Cis Content of Butadiene Units)

The cis content of double bonds in the butadiene units of the sample was measured using a JNM-ECA series NMR apparatus (JEOL Ltd.). The measurement was performed as follows: a 1 g portion of the sample was dissolved in 15 ml of toluene, and the solution was slowly poured into 30 ml of methanol, purified and dried. The thus treated sample was subjected to the measurement.

(Measurement of Styrene Component Content)

The styrene content was measured using a JNM-ECA series NMR apparatus (JEOL Ltd.).

(Measurement of Epoxidation Degree)

The epoxidized low molecular weight butadiene polymers (1) and (2) each were dissolved in deuterated chloroform. The ratio between the number of diene units before epoxidation and the number of epoxidized diene units was determined by nuclear magnetic resonance (NMR) spectrometry (JNM-ECA series by JEOL Ltd.), and the epoxidation degree was calculated based on the following formula:

(Epoxidation degree E %)=(number of epoxy groups in main chain of polymer)/(number of diene units (including epoxidized units) in main chain of polymer)×100.

Examples and Comparative Examples

Based on the formulations shown in Tables 1 to 3, the chemicals other than the sulfur and vulcanization accelerator were kneaded for 4 minutes using a Bunbury mixer to give a kneaded mixture. Then, the sulfur and vulcanization accelerator were added to the kneaded mixture and they were kneaded for 4 minutes using an open roll mill to give an unvulcanized rubber composition. A part of the obtained unvulcanized rubber composition was press-vulcanized for 12 minutes at 170° C. to give a vulcanized rubber composition.

Another part of the unvulcanized rubber composition was formed into the shape of a sidewall, assembled with other tire components in a tire building machine, and press-vulcanized for 20 minutes at 170° C. to produce a test tire (tire size: 195/65R15).

The obtained unvulcanized rubber compositions, vulcanized rubber compositions, and test tires were evaluated as follows. Tables 1 to 3 show the results.

(Processability)

The Mooney viscosity of the unvulcanized composition of each formulation was measured at 130° C. in accordance with JIS K 6300, and the value was converted into an index value based on the value in Comparative Example 1 which was regarded as 100. A larger index value indicates a lower viscosity and easier processing. If the index value is 100 or higher, this performance property is good.

(Processability index)=(Mooney viscosity in Comparative Example 1)/(Mooney viscosity of each formulation)×100

(Adhesion)

The adhesive force [N] of the unvulcanized rubber composition of each formulation was measured using a PICMA Tack Tester (Toyo Seiki Seisaku-sho, Ltd.) under the conditions of a measurement temperature of 23° C., a load of 4.9 N, a sticking time of 10 seconds, and a separating speed of 30 mm/min, in accordance with JIS T 9233. The adhesion index of the rubber composition in Comparative Example 1 was regarded as 100, and the adhesive force was converted into an index value based on the following formula. A larger adhesion index value indicates higher adhesive force, and better performance. If the index value is 105 to 130, this performance property is good.

(Adhesion index)=(adhesive force of each formulation)/(adhesive force in Comparative Example 1)×100

(Low Heat Build-Up)

The loss tangent (tan δ) of the vulcanized rubber sheet (vulcanized rubber composition) at 70° C. was measured using a viscoelastic spectrometer (produced by Iwamoto Seisakusho Co., Ltd.) under the conditions of a frequency of 10 Hz, an initial strain of 10%, and a dynamic strain of 2%. The index of low heat build-up in Comparative Example 1 was regarded as 100, and the tan δ of each formulation was converted into an index value based on the following formula. A larger value of index of low heat build-up indicates less heat build-up, and better performance in terms of low heat build-up. If the index value is 100 or higher, this performance property is good.

(Index of low heat build-up)=(tan δ in Comparative Example 1)/(tan δ of each formulation)×100

(Rubber Strength)

A tensile test was performed in accordance with JIS K 6251, and the elongation at break was measured. The measurement result was indicated as an index value based on the result of Comparative Example 1 which was regarded as 100. A larger index value indicates higher tensile strength. If the index value is 105 or higher, this performance property is good.

(Rubber strength index)=(elongation at break of each formulation)/(elongation at break in Comparative Example 1)×100

(Handling Stability)

The test tire was mounted on each wheel of an FF vehicle (2000 cc, made in Japan), and a trial run was performed on a test course. The handling stability was sensorily evaluated by a driver. The evaluation was based on a 10-point scale, and the handling stability of each formulation was evaluated relative to the handling stability of Comparative Example 1 which was rated as 6. A higher rating indicates better handling stability. If the rating is 6 or higher, this performance property is good.

TABLE 1

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Formulation (parts by mass) | NR | 40 | 40 | 40 | 40 | 40 | 40 | 40 |
| | BR (1) (high-cis, non-modified) | 60 | 60 | 60 | 60 | 60 | 60 | 60 |
| | BR (2) (low-cis, modified) | — | — | — | — | — | — | — |
| | BR (3) (high-cis, modified) | — | — | — | — | — | — | — |
| | Carbon black | 5 | 5 | 5 | 5 | 5 | 5 | 5 |
| | Silica (1-1) ($N_2SA$: 80) | — | — | — | — | — | — | — |
| | Silica (1-2) ($N_2SA$: 110) | 70 | 70 | 70 | 70 | 70 | 70 | 70 |
| | Silica (2-1) ($N_2SA$: 160) | — | — | — | — | — | — | — |
| | Silica (2-2) ($N_2SA$: 200) | — | — | — | — | — | — | — |
| | Silane coupling agent | 5.6 | 5.6 | 5.6 | 5.6 | 5.6 | 5.6 | 5.6 |
| | Aromatic oil | 12 | — | — | — | — | — | — |
| | Ester plasticizer (1) (Tg: −65° C.) | — | 12 | — | — | 6 | 6 | 40 |
| | Ester plasticizer (2) (Tg: −70° C.) | — | — | — | — | 6 | — | — |
| | Low molecular weight butadiene polymer (1) (Tg: −72° C.) | — | — | — | — | — | — | — |
| | Low molecular weight butadiene polymer (2) (Tg: −74° C.) | — | — | — | — | — | — | — |
| | Low molecular weight butadiene polymer (3) (Tg: −68° C., modified) | — | — | — | — | — | — | — |
| | Low molecular weight butadiene polymer (4) (Tg: −76° C.) | — | — | — | — | — | — | — |
| | Low molecular weight styrene-butadiene copolymer (Tg: −52° C., modified) | — | — | — | — | — | — | — |
| | Epoxidized low molecular weight butadiene polymer (1) (Tg: −72° C.) | — | — | — | — | — | — | — |
| | Epoxidized low molecular weight butadiene polymer (2) (Tg: −62° C.) | — | — | — | — | — | — | — |
| | Aromatic petroleum resin (1) (Tg: −30° C.) | — | — | 12 | 6 | — | — | 40 |
| | Aromatic petroleum resin (2) (Tg: 10° C.) | — | — | — | 6 | — | — | — |
| | Aromatic petroleum resin (3) (Tg: 90° C.) | — | — | — | — | — | 6 | — |
| | Terpenic resin (Tg: −38° C.) | — | — | — | — | — | — | — |
| | Rosin resin (Tg: −33° C.) | — | — | — | — | — | — | — |
| | Antioxidant | 2 | 2 | 2 | 2 | 2 | 2 | 2 |
| | Stearic acid | 2 | 2 | 2 | 2 | 2 | 2 | 2 |
| | Zinc oxide | 2 | 2 | 2 | 2 | 2 | 2 | 2 |
| | Sulfur | 2 | 2 | 2 | 2 | 2 | 2 | 2 |
| | Vulcanization accelerator | 2 | 2 | 2 | 2 | 2 | 2 | 2 |
| Evaluation | Processability index (a) | 100 | 110 | 95 | 93 | 112 | 105 | 150 |
| | Adhesion index (b) | 100 | 92 | 108 | 110 | 90 | 106 | 160 |
| | Index of low heat build-up (c) | 100 | 108 | 98 | 97 | 106 | 90 | 95 |

TABLE 1-continued

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Rubber strength index (d) | 100 | 85 | 112 | 115 | 82 | 100 | 80 |
| Handling stability | 6 | 5.5 | 6 | 6 | 5.5 | 6 | 4.5 |

TABLE 2

| | | Example 1 | Example 2 | Example 3 | Example 4 | Example 5 | Example 6 | Example 7 |
|---|---|---|---|---|---|---|---|---|
| Formulation (parts by mass) | NR | 40 | 40 | 40 | 40 | 40 | 40 | 40 |
| | BR (1) (high-cis, non-modified) | 60 | 60 | 60 | 60 | 60 | 60 | 60 |
| | BR (2) (low-cis, modified) | — | — | — | — | — | — | — |
| | BR (3) (high-cis, modified) | — | — | — | — | — | — | — |
| | Carbon black | 5 | 5 | 5 | 5 | 5 | 5 | 5 |
| | Silica (1-1) ($N_2SA$: 80) | — | — | — | — | — | — | — |
| | Silica (1-2) ($N_2SA$: 110) | 70 | 70 | 70 | 70 | 70 | 70 | 70 |
| | Silica (2-1) ($N_2SA$: 160) | — | — | — | — | — | — | — |
| | Silica (2-2) ($N_2SA$: 200) | — | — | — | — | — | — | — |
| | Silane coupling agent | 5.6 | 5.6 | 5.6 | 5.6 | 5.6 | 5.6 | 5.6 |
| | Aromatic oil | — | — | — | — | — | — | — |
| | Ester plasticizer (1) (Tg: −65° C.) | 6 | 15 | 6 | 6 | 6 | — | — |
| | Ester plasticizer (2) (Tg: −70° C.) | — | — | — | — | — | 6 | — |
| | Low molecular weight butadiene polymer (1) (Tg: −72° C.) | — | — | — | — | — | — | 6 |
| | Low molecular weight butadiene polymer (2) (Tg: −74° C.) | — | — | — | — | — | — | — |
| | Low molecular weight butadiene polymer (3) (Tg: −68° C., modified) | — | — | — | — | — | — | — |
| | Low molecular weight butadiene polymer (4) (Tg: −76° C.) | — | — | — | — | — | — | — |
| | Low molecular weight styrene-butadiene copolymer (Tg: −52° C., modified) | — | — | — | — | — | — | — |
| | Epoxidized low molecular weight butadiene polymer (1) (Tg: −72° C.) | — | — | — | — | — | — | — |
| | Epoxidized low molecular weight butadiene polymer (2) (Tg: −62° C.) | — | — | — | — | — | — | — |
| | Aromatic petroleum resin (1) (Tg: −30° C.) | 6 | 15 | — | — | — | 6 | 6 |
| | Aromatic petroleum resin (2) (Tg: 10° C.) | — | — | 6 | — | — | — | — |
| | Aromatic petroleum resin (3) (Tg: 90° C.) | — | — | — | — | — | — | — |
| | Terpenic resin (Tg: −38° C.) | — | — | — | 6 | — | — | — |
| | Rosin resin (Tg: −33° C.) | — | — | — | — | 6 | — | — |
| | Antioxidant | 2 | 2 | 2 | 2 | 2 | 2 | 2 |
| | Stearic acid | 2 | 2 | 2 | 2 | 2 | 2 | 2 |
| | Zinc oxide | 2 | 2 | 2 | 2 | 2 | 2 | 2 |
| | Sulfur | 2 | 2 | 2 | 2 | 2 | 2 | 2 |
| | Vulcanization accelerator | 2 | 2 | 2 | 2 | 2 | 2 | 2 |
| Evaluation | Processability index (a) | 108 | 115 | 105 | 107 | 104 | 108 | 102 |
| | Adhesion index (b) | 107 | 120 | 112 | 106 | 105 | 106 | 110 |
| | Index of low heat build-up (c) | 105 | 103 | 103 | 106 | 104 | 106 | 107 |
| | Rubber strength index (d) | 108 | 105 | 112 | 106 | 108 | 105 | 112 |
| | Handling stability | 6 | 6 | 6 | 6 | 6 | 6 | 6.25 |

| | | Example 8 | Example 9 | Example 10 | Example 11 | Example 12 | Example 13 |
|---|---|---|---|---|---|---|---|
| Formulation (parts by mass) | NR | 40 | 40 | 40 | 40 | 40 | 40 |
| | BR (1) (high-cis, non-modified) | 60 | 60 | 60 | 60 | 60 | 60 |
| | BR (2) (low-cis, modified) | — | — | — | — | — | — |
| | BR (3) (high-cis, modified) | — | — | — | — | — | — |
| | Carbon black | 5 | 5 | 5 | 5 | 5 | 5 |
| | Silica (1-1) ($N_2SA$: 80) | — | — | — | — | — | — |
| | Silica (1-2) ($N_2SA$: 110) | 70 | 70 | 70 | 70 | 70 | 70 |
| | Silica (2-1) ($N_2SA$: 160) | — | — | — | — | — | — |
| | Silica (2-2) ($N_2SA$: 200) | — | — | — | — | — | — |
| | Silane coupling agent | 5.6 | 5.6 | 5.6 | 5.6 | 5.6 | 5.6 |
| | Aromatic oil | — | — | — | — | — | — |
| | Ester plasticizer (1) (Tg: −65° C.) | — | — | — | — | — | — |
| | Ester plasticizer (2) (Tg: −70° C.) | — | — | — | — | — | — |
| | Low molecular weight butadiene polymer (1) (Tg: −72° C.) | — | — | — | — | — | — |

TABLE 2-continued

|  |  |  |  |  |  |  |  |
|---|---|---|---|---|---|---|---|
|  | Low molecular weight butadiene polymer (2) (Tg: −74° C.) | 6 | — | — | — | — | — |
|  | Low molecular weight butadiene polymer (3) (Tg: −68° C., modified) | — | 6 | — | — | — | — |
|  | Low molecular weight butadiene polymer (4) (Tg: −76° C.) | — | — | 6 | — | — | — |
|  | Low molecular weight styrene-butadiene copolymer (Tg: −52° C., modified) | — | — | — | 6 | — | — |
|  | Epoxidized low molecular weight butadiene polymer (1) (Tg: −72° C.) | — | — | — | — | 6 | — |
|  | Epoxidized low molecular weight butadiene polymer (2) (Tg: −62° C.) | — | — | — | — | — | 6 |
|  | Aromatic petroleum resin (1) (Tg: −30° C.) | 6 | 6 | 6 | 6 | 6 | 6 |
|  | Aromatic petroleum resin (2) (Tg: 10° C.) | — | — | — | — | — | — |
|  | Aromatic petroleum resin (3) (Tg: 90° C.) | — | — | — | — | — | — |
|  | Terpenic resin (Tg: −38° C.) | — | — | — | — | — | — |
|  | Rosin resin (Tg: −33° C.) | — | — | — | — | — | — |
|  | Antioxidant | 2 | 2 | 2 | 2 | 2 | 2 |
|  | Stearic acid | 2 | 2 | 2 | 2 | 2 | 2 |
|  | Zinc oxide | 2 | 2 | 2 | 2 | 2 | 2 |
|  | Sulfur | 2 | 2 | 2 | 2 | 2 | 2 |
|  | Vulcanization accelerator | 2 | 2 | 2 | 2 | 2 | 2 |
| Evaluation | Processability index (a) | 105 | 100 | 108 | 100 | 100 | 103 |
|  | Adhesion index (b) | 113 | 110 | 118 | 115 | 116 | 112 |
|  | Index of low heat build-up (c) | 105 | 110 | 103 | 103 | 109 | 111 |
|  | Rubber strength index (d) | 109 | 108 | 110 | 115 | 110 | 108 |
|  | Handling stability | 6.25 | 6.25 | 6 | 6.25 | 6.25 | 6.25 |

TABLE 3

|  |  | Comparative Example 8 | Example 14 | Example 15 | Example 16 | Example 17 | Example 18 |
|---|---|---|---|---|---|---|---|
| Formulation (parts by mass) | NR | 40 | 40 | 40 | 40 | 40 | 40 |
|  | BR (1) (high-cis, non-modified) | 60 | 60 | 60 | 60 | 60 | 60 |
|  | BR (2) (low-cis, modified) | — | — | — | — | — | — |
|  | BR (3) (high-cis, modified) | — | — | — | — | — | — |
|  | Carbon black | 5 | 5 | 5 | 5 | 5 | 5 |
|  | Silica (1-1) (N$_2$SA: 80) | — | — | — | — | 35 | 35 |
|  | Silica (1-2) (N$_2$SA: 110) | — | 10 | 35 | 60 | — | — |
|  | Silica (2-1) (N$_2$SA: 160) | — | 60 | 35 | 10 | 35 | — |
|  | Silica (2-2) (N$_2$SA: 200) | 70 | — | — | — | — | 35 |
|  | Silane coupling agent | 5.6 | 5.6 | 5.6 | 5.6 | 5.6 | 5.6 |
|  | Aromatic oil | 12 | — | — | — | — | — |
|  | Ester plasticizer (1) (Tg: −65° C.) | — | 6 | 6 | 6 | 6 | 6 |
|  | Ester plasticizer (2) (Tg: −70° C.) | — | — | — | — | — | — |
|  | Low molecular weight butadiene polymer (1) (Tg: −72° C.) | — | — | — | — | — | — |
|  | Low molecular weight butadiene polymer (2) (Tg: −74° C.) | — | — | — | — | — | — |
|  | Low molecular weight butadiene polymer (3) (Tg: −68° C., modified) | — | — | — | — | — | — |
|  | Low molecular weight butadiene polymer (4) (Tg: −76° C.) | — | — | — | — | — | — |
|  | Low molecular weight styrene-butadiene copolymer (Tg: −52° C., modified) | — | — | — | — | — | — |
|  | Epoxidized low molecular weight butadiene polymer (1) (Tg: −72° C.) | — | — | — | — | — | — |
|  | Epoxidized low molecular weight butadiene polymer (2) (Tg: −62° C.) | — | — | — | — | — | — |
|  | Aromatic petroleum resin (1) (Tg: −30° C.) | — | 6 | 6 | 6 | 6 | 6 |
|  | Aromatic petroleum resin (2) (Tg: 10° C.) | — | — | — | — | — | — |
|  | Aromatic petroleum resin (3) (Tg: 90° C.) | — | — | — | — | — | — |
|  | Terpenic resin (Tg: −38° C.) | — | — | — | — | — | — |
|  | Rosin resin (Tg: −33° C.) | — | — | — | — | — | — |
|  | Antioxidant | 2 | 2 | 2 | 2 | 2 | 2 |
|  | Stearic acid | 2 | 2 | 2 | 2 | 2 | 2 |

TABLE 3-continued

|  |  |  |  |  |  |  |  |
|---|---|---|---|---|---|---|---|
|  | Zinc oxide | 2 | 2 | 2 | 2 | 2 | 2 |
|  | Sulfur | 2 | 2 | 2 | 2 | 2 | 2 |
|  | Vulcanization accelerator | 2 | 2 | 2 | 2 | 2 | 2 |
| Evaluation | Processability index (a) | 80 | 100 | 105 | 108 | 114 | 105 |
|  | Adhesion index (b) | 85 | 105 | 106 | 107 | 108 | 105 |
|  | Index of low heat build-up (c) | 90 | 100 | 103 | 104 | 107 | 102 |
|  | Rubber strength index (d) | 145 | 130 | 125 | 120 | 107 | 140 |
|  | Handling stability | 6.5 | 6.5 | 6.5 | 6.5 | 6 | 6.5 |

|  |  | Example 19 | Example 20 | Example 21 | Example 22 | Example 23 |
|---|---|---|---|---|---|---|
| Formulation (parts by mass) | NR | 40 | 40 | 40 | 40 | 40 |
|  | BR (1) (high-cis, non-modified) | — | — | — | — | — |
|  | BR (2) (low-cis, modified) | 60 | 10 | 30 | 50 | 30 |
|  | BR (3) (high-cis, modified) | — | 50 | 30 | 10 | 30 |
|  | Carbon black | 5 | 5 | 5 | 5 | 5 |
|  | Silica (1-1) ($N_2SA$: 80) | — | — | — | — | 35 |
|  | Silica (1-2) ($N_2SA$: 110) | 70 | 70 | 70 | 70 | — |
|  | Silica (2-1) ($N_2SA$: 160) | — | — | — | — | — |
|  | Silica (2-2) ($N_2SA$: 200) | — | — | — | — | 35 |
|  | Silane coupling agent | 5.6 | 5.6 | 5.6 | 5.6 | 5.6 |
|  | Aromatic oil | — | — | — | — | — |
|  | Ester plasticizer (1) (Tg: −65° C.) | 6 | 6 | 6 | 6 | 6 |
|  | Ester plasticizer (2) (Tg: −70° C.) | — | — | — | — | — |
|  | Low molecular weight butadiene polymer (1) (Tg: −72° C.) | — | — | — | — | — |
|  | Low molecular weight butadiene polymer (2) (Tg: −74° C.) | — | — | — | — | — |
|  | Low molecular weight butadiene polymer (3) (Tg: −68° C., modified) | — | — | — | — | — |
|  | Low molecular weight butadiene polymer (4) (Tg: −76° C.) | — | — | — | — | — |
|  | Low molecular weight styrene-butadiene copolymer (Tg: −52° C., modified) | — | — | — | — | — |
|  | Epoxidized low molecular weight butadiene polymer (1) (Tg: −72° C.) | — | — | — | — | — |
|  | Epoxidized low molecular weight butadiene polymer (2) (Tg: −62° C.) | — | — | — | — | — |
|  | Aromatic petroleum resin (1) (Tg: −30° C.) | 6 | 6 | 6 | 6 | 6 |
|  | Aromatic petroleum resin (2) (Tg: 10° C.) | — | — | — | — | — |
|  | Aromatic petroleum resin (3) (Tg: 90° C.) | — | — | — | — | — |
|  | Terpenic resin (Tg: −38° C.) | — | — | — | — | — |
|  | Rosin resin (Tg: −33° C.) | — | — | — | — | — |
|  | Antioxidant | 2 | 2 | 2 | 2 | 2 |
|  | Stearic acid | 2 | 2 | 2 | 2 | 2 |
|  | Zinc oxide | 2 | 2 | 2 | 2 | 2 |
|  | Sulfur | 2 | 2 | 2 | 2 | 2 |
|  | Vulcanization accelerator | 2 | 2 | 2 | 2 | 2 |
| Evaluation | Processability index (a) | 107 | 101 | 106 | 107 | 115 |
|  | Adhesion index (b) | 107 | 105 | 105 | 106 | 105 |
|  | Index of low heat build-up (c) | 117 | 118 | 120 | 117 | 124 |
|  | Rubber strength index (d) | 110 | 114 | 118 | 114 | 136 |
|  | Handling stability | 6 | 6 | 6 | 6 | 6.5 |

In the Examples in which predetermined amounts of the plasticizer (a) having a glass transition point in a specific range and the resin having a glass transition point in a specific range were used, the fuel economy, processability, adhesion, and rubber strength were improved in a balanced manner, and the handling stability was also good. Particularly in the Examples in which the modified BRs (2) and/or (3) were used, and the Examples in which two types of silica having different $N_2SA$ values were used, the above performance properties were greatly improved.

The invention claimed is:

1. A tire rubber composition, comprising:
  a rubber component;
  a plasticizer (a); and
  at least one of a resin and a plasticizer (b), the resin being at least one selected from the group consisting of aromatic petroleum resins, terpenic resins, and rosin resins,
  the plasticizer (a) having a glass transition point of −50° C. or lower,
  the resin and the plasticizer (b) each having a glass transition point of −40° C. to 20° C., and
  the tire rubber composition comprising, for each 100 parts by mass of the rubber component, 1 to 30 parts by mass of the plasticizer (a) and 1 to 30 parts by mass in total of the at least one of the resin and the plasticizer (b).

2. The tire rubber composition according to claim 1, comprising, for each 100 parts by mass of the rubber component, 10 to 120 parts by mass of silica having a nitrogen adsorption specific surface area of 50 m²/g or more, and
  comprising, based on 100% by mass of the rubber component, 10% by mass or more of a modified diene rubber which is modified by a compound represented by the following formula (I):

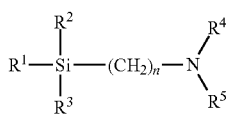

(1)

wherein $R^1$, $R^2$, and $R^3$ may be the same as or different from each other, and each represent an alkyl group, an alkoxy group, a silyloxy group, an acetal group, a carboxyl group, a mercapto group, or a derivative thereof; $R^4$ and $R^5$ may be the same as or different from each other, and each represent a hydrogen atom or an alkyl group; and n represents an integer.

3. The tire rubber composition according to claim 2, wherein the silica includes silica (1) having a nitrogen adsorption specific surface area of 50 m²/g or more but less than 120 m²/g and silica (2) having a nitrogen adsorption specific surface area of 120 m²/g or more, and a total amount of the silica (1) and the silica (2) is 10 to 120 parts by mass for each 100 parts by mass of the rubber component.

4. The tire rubber composition according to claim 3, wherein the silica (1) and the silica (2) satisfy the following relations:

(nitrogen adsorption specific surface area of silica (2))/(nitrogen adsorption specific surface area of silica (1))≥1.4; and (amount of silica (1))×0.06 ≤ (amount of silica (2)) ≤ 5 (amount of silica (1))×15.

5. The tire rubber composition according to claim 1, comprising a butadiene rubber having a cis content of double bonds of 50 mol % or less and a butadiene rubber having a cis content of double bonds of 95 mol % or more.

6. The tire rubber composition according to claim 5, wherein the butadiene rubber having a cis content of double bonds of 95 mol % or more is obtained by polymerization in the presence of a neodymium catalyst.

7. The tire rubber composition according to claim 1, wherein at least one of the plasticizer (a) and the plasticizer (b) is a diene polymer having a weight average molecular weight of 3,000 to 150,000.

8. The tire rubber composition according to claim 1, wherein the plasticizer (a) is at least one of an ester plasticizer and a diene polymer having a weight average molecular weight of 3,000 to 150,000 and a vinyl content of 35 mol % or less, and the diene polymer has been modified by a compound represented by the following formula (I):

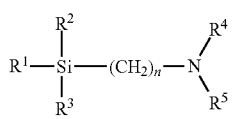

(1)

wherein $R^1$, $R^2$, and $R^3$ may be the same as or different from each other, and each represent an alkyl group, an alkoxy group, a silyloxy group, an acetal group, a carboxyl group, a mercapto group, or a derivative thereof; $R^4$ and $R^5$ may be the same as or different from each other, and each represent a hydrogen atom or an alkyl group; and n represents an integer.

9. The tire rubber composition according to claim 1, wherein at least one of the plasticizer (a) and the plasticizer (b) is a diene polymer having an epoxidation degree of 25 mol % or less.

10. The tire rubber composition according to claim 1, which is for use in a sidewall.

11. A pneumatic tire, which is produced using the rubber composition according to claim 1.

\* \* \* \* \*